Patented Oct. 1, 1974

3,839,455
FUNGISTATICALLY AND BACTERIOSTATICALLY ACTIVE ACETYLENE COMPOUNDS
Arthur Scherm, Bad Homburg vor der Hohe, and Deszo Peteri, Frankfurt am Main, Germany, assignors to Merz & Co., Chemische Fabrik, Frankfurt am Main, Germany
No Drawing. Filed May 27, 1971, Ser. No. 147,661
Claims priority, application Germany, Apr. 16, 1971, P 21 18 437.2
Int. Cl. C07c 49/80
U.S. Cl. 260—592   3 Claims

ABSTRACT OF THE DISCLOSURE

1-Alkenyl-2 - benzoylacetylenes having fungistatic and bacteriostatic properties are prepared by reacting Grignard derivatives of alkenynes with a benzaldehyde and thereafter oxidizing the reaction product to a corresponding ketone.

BACKGROUND OF THE INVENTION

Naturally occurring acetylene derivatives are described in Arzneimittelforschung 17, No. 7, 816 (1967). These derivatives have a remarkable bacteriostatic or fungistatic effect. 1-Phenyl-hexadien(2,4)-one(1) proved to be the strongest fungistatic agent among these natural substances. However, the therapeutic utilization of these natural acetylene derivatives is considerably limited because of their very low stability and in part by their very high toxicity.

SUMMARY OF THE INVENTION

Surprisingly, it has now been found that compounds of the general formula

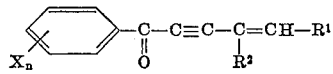

wherein $R^1$ and $R^2$ can be alike or different and can be hydrogen or lower alkyl containing 1 to 6 carbon atoms, inclusive, i.e., methyl, ethyl, propyl, isopropyl, butyl, pentyl, hexyl, and the like; wherein X is halo, i.e., chloro, bromo, fluoro, or iodo; and wherein $n$ is an integer having a value of zero to 5, inclusive, preferably 0 to 2, inclusive, have excellent fungicidal activity, are stable, and exhibit very little toxicity.

The compounds of this invention are prepared by reacting a Grignard derivative of an alkenyne with a benzaldehyde and thereafter oxidizing the reaction product to a corresponding ketone.

DESCRIPTION OF THE PREFERRED EMBODIMENTS

Suitable benzaldehydes for the purposes of the present invention can be optionally halogenated, if desired. Illustrative are benzaldehyde, 4-chlorobenzaldehyde, 2-chlorobenzaldehyde, 2,6-dichlorobenzaldehyde, 2-bromobenzaldehyde, 4-bromobenzaldehyde, 4-fluorobenzaldehyde, 4-iodobenzaldehyde, and the like.

Suitable alkenynes are the 3-alken-1-ynes of the formula

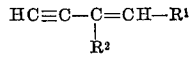

wherein $R^1$ and $R^2$ have the same meaning as above. Typical of such compounds are 3-buten-1-yne, 3-decen-1-yne, 2-hexyl-1-buten-3-yne, 3-penten-1-yne, 2-methyl-1-buten - 3 - yne, 2-ethyl-1-buten-3-yne, 3-ethyl-3-hepten-1-yne, and the like.

In carrying out the reaction, a bromoalkane or iodoalkane such as bromoethane in a suitable solvent such as diethyl ether or tetrahydrofuran is added to a suspension of magnesium in diethyl ether or the like and, after completion of the resulting reaction a solution of 3-alken-1-yne in diethyl ether or the like is added and the admixture heated until alkane evolution is completed. Thereafter a benzaldehyde is added to reaction mixture and reacted with the obtained Grignard derivative of the 3-alken-1-yne. The obtained reaction product is then hydrolyzed and the resulting alcohol subsequently oxidized with an alcohol oxidizing agent such as chromic acid or potassium dichromate to produce the corresponding ketone.

The present invention is further illustrated by the following examples:

EXAMPLE 1: Preparation of 1-isopropenyl-2-benzoylacetylene

A solution of 10.8 g. of bromoethane in about 20 ml. of diethyl ether is added drop by drop while stirring constantly at about 35° C., to 50 ml. of absolute diethyl ether and 2.43 g. magnesium. After completion of the reaction, a solution of 6.6 g. of 2-methyl-1-buten-3-yne in 20 ml. of diethyl ether is added and the mixture is heated until completion of the ethane development. While cooling with ice, a solution of 10.6 g. of benzaldehyde in 60 ml. of diethyl ether is added drop by drop to the reaction mixture and the mixture is stirred for about 1 hour at ambient temperature. Subsequently the reaction mixture is hydrolized with ice water and ammonium chloride and the alcohol which developed is extracted with ether. After drawing off of the solvent, the residue is distilled in the vacuum. An almost colorless oil boiling between 108 and 112° C. at a pressure of 1 mm. is obtained at a yield of 79.9 g.

For the oxidation, 17.2 g. of the alcohol obtained are dissolved in 100 ml. of acetone. Then 7.2 g. chromium trioxide in 30 ml. of water are added drop by drop while stirring at a maximum 5° C. Simultaneously, 6 g. of concentrated sulfuric acid, which had been diluted with 30 ml. of water, is added to the reaction mixture, likewise drop by drop. The reaction takes about 2 hours. After the addition of 100 ml. of water, the reaction product is extracted with diethyl ether. The ethereal solution is dried and the residue is fractionally distilled in the vacuum via a colum. 7.2 g. of a slightly yellow oil is obtained, which has a boiling point of 91° C. at a pressure of 1 mm.

The 1-isopropenyl-2-benzoyl acetylen produced in this way was tested within the framework of a series dilution test concerning its anti-mycetic effect *in vitro*. An ethanol water mixture was used as solvent and diluant. The strains of fungi used were: Trichophyton rubrum (T.r.), Trichophyton metagrophytes (T.m.), Microsporum gypseum (M.g.), Candida albicans (C.a.), and Verti sillium species, isolated from a calcium ampoule (V. sp.).

| Dilutions | Test strains | | | | | |
|---|---|---|---|---|---|---|
| | T. r. | T. m. | M. g. | C. a. | V. sp. | Control |
| 1:500,000 | 0 | 0 | 0 | 0 | 0 | ++++ |
| 1:1,000,000 | 0 | 0 | 0 | + | ++ | ++++ |
| 1:2,000,000 | 0 | 0 | 0 | ++ | ++ | ++++ |
| 1:5,000,000 | 0 | +K | +K | +++ | +++ | ++++ |
| 1:10,000,000 | ++ | +++ | ++ | ++++ | +++ | ++++ |
| 1:20,000,000 | +++ | +++ | +++ | ++++ | ++++ | ++++ |

NOTE: 0=no growth; +=almost total inhibition; +K=only isolated colonies have grown; ++=strong inhibition; +++=weak inhbition; and ++++=no inhibition.

The table clearly shows the excellent fungistatic properties of the new acetylene compounds.

EXAMPLE 2: Preparation of 1-isopropenyl-2-(4-chlorobenzoyl)-acetylene 12.15 g. of magnesium shavings are covered with a layer of 50 ml. anhydrous tetrahydrofuran. 54 g. of ethyl bromide are dissolved under nitrogen in 100 ml. of anhydrous tetrahydrofuran and are added drop by drop at such a rate that the temperature remains between 40–50° C. Subsequently the mixture is boiled for 30 minutes under reflux. After cooling to 20° C. 53 ml. 2-methyl-1-buten-3-yne, dissolved in 50 ml. of anhydrous tetrahydrofuran, is added drop by drop in such a way that the temperature does not rise about 30° C. Then this is boiled for 30 minutes with reflux. After cooling with an ice-common salt mixture to 0° C., 70.3 g. 4-chlorobenzaldehyde, dissolved in 150 ml. of anhydrous tetrahydrofuran, at a temperature between 5–10° C., is added drop by drop and is allowed to react for 45 minutes under reflux.

The cooled reaction mixture is then poured onto a mixture consisting of 150 g. of ammonium chloride, 200 ml. of water and 250 g. of ice, and this is stirred for 1 hour. After separation of the organic phase, it is washed with sodium sulfite, soda and subsequently with water up to the neutral reaction. After drying with sodium sulfate and addition of 0.5% hydroquinone, the reaction product is fractionated in the high vacuum.

Boiling point: 114–116° C./0.03 mm.
Yield: 53 g.=49% of theory.

The oxidation of this alcohol is accomplished in the following manner: 20.6 g. alcohol are dissolved in 60 ml. of acetone and cooled to 0° C.

Now a solution of 7 g. of chromium trioxide, 11.2 g. concentrated sulfuric acid, 30 ml. of water is produced which is also cooled to 0° C.

The oxidation solution is added to the acetone solution drop by drop within 2 hours, whereby the temperature of 10° C. is not to be exceeded. The after-reaction takes place for about 3 hours at ambient temperature.

The reaction mixture is extracted with diethyl ether, whereby the organic phase is subsequently washed with water and is then dried. After distilling the diethyl ether off, the residue is fractionated in the high vacuum.

The fraction, boiling between 105–110° C./0.04 mm., is collected, which crystallizes after standing.

Melting point: 50° C.
Yield: 13.2 g.=63% of theory.

1 - Isopropenyl-2-(4-chlorobenzoyl)acetylene produced in this manner was tested in accordance with the procedure set forth in Example 1 in regard to its fungisatic and bacteriostatic effectiveness. The following results were obtained:

| Dilutions | Trychophyton rubrum | Microsporum canis | Candida albicans | Penicillium janczevsy |
|---|---|---|---|---|
| 1:2,000 | − | − | − | − |
| 1:5,000 | − | − | − | − |
| 1:50,000 | − | (+) | (+) | (+) |
| 1:250,000 | (+) | + | + | + |
| 1:1,250,000 | + | + | + | + |
| 1:3,125,000 | + | + | + | + |
| 1:6,250,000 | + | + | + | + |

NOTE: −=no growth; (+)=almost total inhibition; and +=no growth comparable to that of the controls.

A further advantage of the compounds of this invention is that in addition to the strong fungistatic effect not only against hyphomycetes and fungus but also against mold fungi, these compounds additionally have an inhibitory effect against bacteria. Moreover, therapeutically effective amounts of the compound when applied topically on a living animal body are compatible therewith and cause no skin irritation.

The compounds can be applied topically in combination with usual excipients in the form of ointments, salves, and the like.

The foregoing description and the examples are intended as illustrative but are not to be construed as limiting. Still other variations within the spirit and scope of the present invention will readily present themselves to one skilled in the art.

We claim:
1. A compound represented by the formula

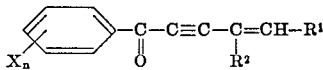

wherein $R^1$ and $R^2$ are members of the group consisting of hydrogen and lower alkyl containing 1 to 6 carbon atoms, inclusive, X is halo, and $n$ is an integer having a value of zero to 5, inclusive.

2. The compound in accordance with Claim 1 wherein $R^1$ is hydrogen, $R^2$ is methyl, and $n$ is zero.

3. The compound in accordance with Claim 1 wherein $R^1$ is hydrogen, $R^2$ is methyl, X is chloro situated in the 4-position on the phenyl group, and $n$ is 1.

References Cited
UNITED STATES PATENTS
3,705,177  12/1972  Chodnekar et al. ____ 260—592
2,868,839   1/1959  Imai et al. _____ 260—592

DANIEL D. HORWITZ, Primary Examiner

U.S. Cl. X.R.
424—331

UNITED STATES PATENT OFFICE
CERTIFICATE OF CORRECTION

Patent No. 3,839,455   Dated October 1, 1974

Inventor(s) Arthur Scherm, et al.

It is certified that error appears in the above-identified patent and that said Letters Patent are hereby corrected as shown below:

Col. 1, line 10:

should read: ---and Germany, May 30, 1970, P 20 26 626.6---

Col. 3, line 51:

"fungisatic" should read ---fungistatic---

Signed and sealed this 1st day of April 1975.

(SEAL)
Attest:

RUTH C. MASON
Attesting Officer

C. MARSHALL DANN
Commissioner of Patents
and Trademarks